US009240997B1

(12) United States Patent
Pearson et al.

(10) Patent No.: US 9,240,997 B1
(45) Date of Patent: Jan. 19, 2016

(54) SECURITY FOR A POWER OVER ETHERNET INSTALLATION

(71) Applicant: Sprint Communications Company L.P., Overland Park, KS (US)

(72) Inventors: Timothy Hugh Pearson, Overland Park, KS (US); Seng Gan, Ashburn, VA (US); Jason Jugar, Centreville, VA (US); Henry Burford, Leesburg, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 31 days.

(21) Appl. No.: 14/036,662

(22) Filed: Sep. 25, 2013

(51) Int. Cl.
*G06F 7/04* (2006.01)
*H04L 29/06* (2006.01)

(52) U.S. Cl.
CPC ................................. *H04L 63/10* (2013.01)

(58) Field of Classification Search
CPC ....................................................... H04L 63/10

USPC ............................................................. 726/3
See application file for complete search history.

(56) References Cited

U.S. PATENT DOCUMENTS

2007/0220618 A1\* 9/2007 Holmes et al. ................... 726/36
2010/0169689 A1\* 7/2010 Liu ................................ 713/340

FOREIGN PATENT DOCUMENTS

JP 2009170983 A \* 7/2009
JP 2009218752 A \* 9/2009

\* cited by examiner

*Primary Examiner* — Mohammad W Reza

(57) ABSTRACT

Aspects of the present invention monitor an electrical circuit in a power over Ethernet ("PoE") installation to detect potential security breaches and implement a security response upon detecting the security event. The security event may be a disruption to the electrical circuit lasting more than a threshold duration (e.g., 250 ms, 0.5 second, 1 second). The disruption can be an open circuit caused by cutting or unplugging the Ethernet cable. In one aspect, the security response can be discontinuing further communications over the PoE connection.

18 Claims, 4 Drawing Sheets

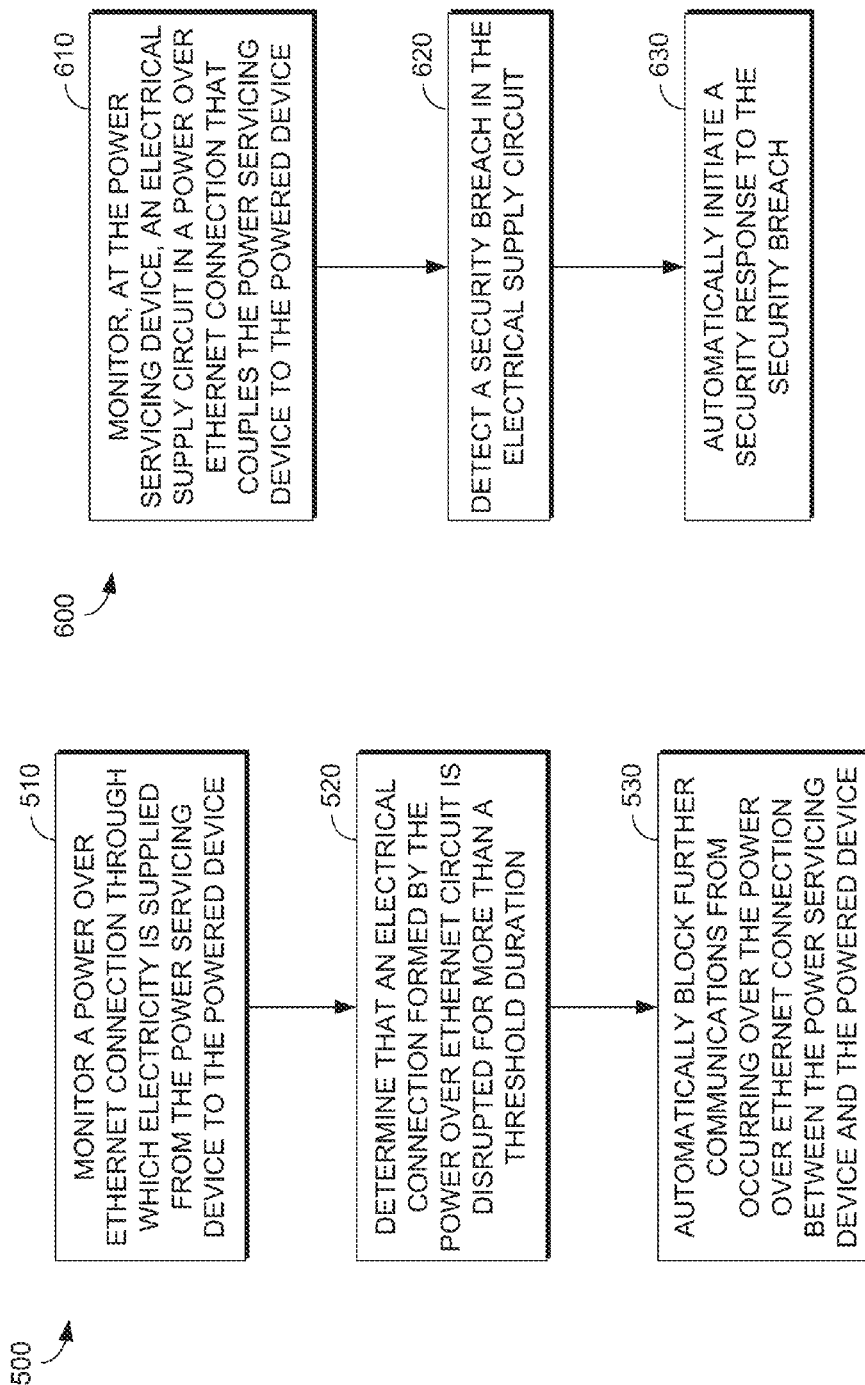

_US 9,240,997 B1_

SECURITY FOR A POWER OVER ETHERNET INSTALLATION

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter nor is it intended to be used as an aid in isolation to determine the scope of the claimed subject matter.

Aspects of the present invention monitor an electrical circuit in a power over Ethernet ("PoE") installation to detect a potential security event that possibly indicates a breach. Upon detecting a breach, a security response is initiated. The security event may be a disruption to the electrical circuit in the PoE lasting more than a threshold duration (e.g., 250 ms, 0.5 second, 1 second). The disruption can be an open circuit caused by cutting or unplugging the Ethernet cable. In one aspect, the security response can be discontinuing further communications over the PoE connection.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein:

FIG. 5 is a flow diagram illustrating a method for providing security to a communications system that comprises a power servicing device coupled by an Ethernet cable to a powered device according to aspects of the invention; and FIG. 6 is a flow diagram illustrating a method for providing security to a power over Ethernet connection according to aspects of the invention.

DETAILED DESCRIPTION

Figure 1:
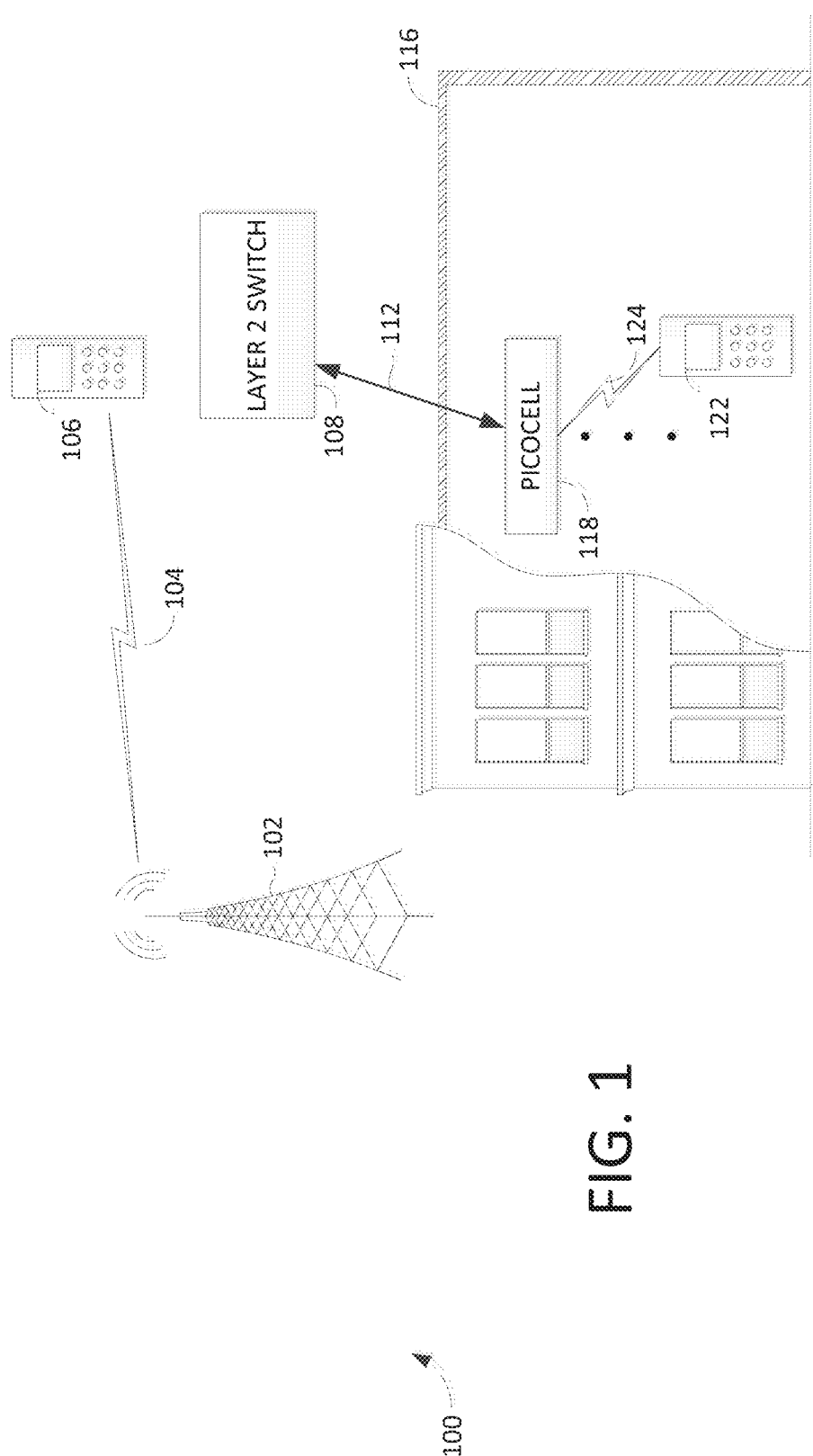
FIG. 1 is a diagram of an exemplary telecommunications system according to aspects of the invention.

Embodiments of the invention provide systems, methods, and computer-readable storage media with computer-readable instructions embodied thereon for controlling a preferred Access Technology list. The terms "step," "block," etc. might be used herein to connote different acts of methods employed, but the terms should not be interpreted as implying any particular order, unless the order of individual steps, blocks, etc. is explicitly described. Likewise, the term "module," "component," etc., might be used herein to connote different components of systems employed, but the terms should not be interpreted as implying any particular order, unless the order of individual modules, components, etc., is explicitly described.

Aspects of the present invention monitor a power over Ethernet ("PoE") installation to detect potential security breaches. A power over Ethernet installation connects a power servicing device to a powered device. The power servicing device provides electrical power to the powered device through the Ethernet cable that connects the two devices. In addition to electrical power, the power over Ethernet cable carries data between the power servicing device and the powered device. The power serving device can be embedded in a switch or router or may be a separate device.

Aspects of the invention can monitor the PoE's electrical circuit for a security event and implement a security response upon detecting the security event. The security event may be a disruption to the electrical circuit lasting more than a threshold duration (e.g., 250 ms, 0.5 second, 1 second). The disruption can be an open circuit caused when the Ethernet cable is cut or unplugged. In one aspect, the security response can be discontinuing further communications over the PoE connection.

Different threshold durations may be used in different installations. In general, the threshold duration can be tailored to the PoE installation's security environment. In one aspect, the duration is based on the minimum amount of time it could take for a security breach to occur. For example, the approximate amount of time it could take to unplug the Ethernet cable from one device and plug it into another can determine the threshold. When the plugs in the PoE installation are not accessible, then the time it could take to cut the Ethernet cable and install a terminal connector can determine the threshold. A comparatively longer duration may be used when all connections in the Ethernet cable are located in a secure location.

An example of a secure installation is when the power servicing device and the powered device are located in a secure location (e.g., a locked room or enclosure) and the Ethernet cable has no intermediate connections. When one or both of the end devices are located in an unsecure area, then a shorter duration threshold may be used because the installation is less secure. A shorter duration is appropriate when an end (or both ends) is unsecure because less time may be needed to breach security. The threshold duration is set to be less than an approximate amount of time needed to breach security in a given PoE installation.

Telecommunications Environment

Turning now to FIG. 1, an exemplary operating system is depicted for carrying out embodiments of the present invention. FIG. 1 depicts an illustrative operating environment, referenced generally by the numeral 100, and illustrates an exemplary networking environment that can be suitable for a secure PoE installation. The illustrative operating environment 100 shown in FIG. 1 is merely an example of one suitable operating environment and is not intended to suggest any limitation as to the scope of use or functionality of embodiments of the present invention. Neither should the operating environment 100 be interpreted as having any dependency or requirement related to any single module/component or combination of modules/components illustrated therein.

The large-coverage access component 102 transmits a radio signal 104 to a mobile device 106. As mentioned, the large-coverage access component 102 may be any type of device that is capable of transmitting a radio signal. In one embodiment, the large-coverage access component 102 is a standard base station that has a large coverage area, as opposed to a small cell (e.g., picocell, femtocell) that has a small coverage area. In an LTE network, the large-coverage access component 102 may be an eNodeB.

Exemplary mobile devices 106 and 122 include a mobile phone, a personal digital assistant (PDA), a one- and two-way pager, a smartphone, a tablet, an e-reader, a laptop, and other devices. Mobile devices 106 and 122 may include devices that typically connect using a wireless communications medium such as radio frequency (RF) devices. A mobile device, as described herein, refers to any type of wireless phone, handheld device, personal digital assistant (PDA), BlackBerry®, smartphone, digital camera, or other mobile devices capable of communicating wirelessly. The mobile devices will also include a processor and computer-storage media to perform various functions. In embodiments of the invention, computing devices can also refer to devices that are running applications. A mobile device can also be referred to as user equipment (UE).

The mobile devices 106 and 122 encompass a general computing system used in accordance with embodiments of the invention. A mobile device computing system includes a bus that directly or indirectly couples a memory region, one or more processors, one or more presentation components, input/output ports, input/output components, and a power supply. The bus may be representative of one or more busses, such as an address bus, data bus, or any combination thereof.

The large-coverage access component 102 may employ a plurality of wireless access technologies including, but not limited to, $2^{nd}$ (2G), $3^{rd}$ (3G), and $4^{th}$ (4G) generation radio access for cellular systems, Wireless-LAN, or Wireless Router (WR) mesh. Access technologies such as 2G, 3G, 4G, 4G LTE, and future access networks may enable wide area coverage for network devices with various degrees of mobility. For example, a wireless network connection over one of the aforementioned access technologies to a device may be established using a protocol for wireless data transfer such as Global System for Mobile communication (GSM), General Packet Radio Services (GPRS), Enhanced Data GSM Environment (EDGE), and Wideband Code Division Multiple Access (WCDMA).

The large-coverage access component 102 can be connected to a wireless gateway (not shown), which may be virtually any device that forwards network traffic. Such a device may include, for example, a router, a proxy, a firewall, an access point, a link load balancer, a device that performs network address translation, or any combination of the preceding devices. The wireless gateway may recognize packets that are part of a particular communication protocol or are the same network connection or application session. The wireless gateway may perform special processing on such packets including granting access to a client machine, logging or not logging an event, or network address and port translation.

In FIG. 1, the small cells, or small-coverage access components include a picocell 118 housed in a building 116. As further described herein, multiple small-coverage access components may be collocated, such as in a single building or other structure to assist with a service provider's coverage and building penetration. The picocell 118 is interconnected to the layer 2 switch 108 using a power over Ethernet ("PoE") connection 112. In one aspect, the layer 2 switch 108 is a router. The PoE 112 connection can carry electricity from the layer 2 switch 108 to the picocell 118 along with data. Though depicted outside the building, the layer 2 switch 108 can be located inside the building, for example in a communications closet or room. Additionally, a single layer 2 switch 108 may be connected to multiple picocells in a single building or spread across multiple buildings. The picocell 118 forms a wireless connection 124 to the mobile device 122 using known communication protocols.

Going back to power over Ethernet, PoE describes systems that pass electrical power along with data on Ethernet cabling. "Ethernet" describes various networking technologies for local area networks. Ethernet cabling that is suitable for PoE includes most varieties of twisted pair cable such as CAT5. Ethernet cable includes four pairs of twisted wire. In one aspect, two of the conductors carry data, while one or more of the conductors not being used for data carry electrical power. In one aspect, electrical power is provided over the same conductors (e.g., twisted pairs) that carry data. Thus, the cable can provide both data and electrical power to a powered device. At a certain point, the data and power can be separated. While power travels over the Ethernet cable, data packets can also travel over the same Ethernet. The data transferred may use UDP as the transport protocol either in IPv4 or IPv6. PoE can be implemented according to IEEE 802.3af and IEEE 802.3at. The power can be regulated to have characteristics suitable for transmission over the Ethernet cable.

Embodiments of the invention include, among other things, a method, system, or set of instructions embodied on one or more computer-readable storage media to select the correct access technology. Computer-readable storage media include both volatile and nonvolatile media, removable and nonremovable media, and media readable by a database and various other network devices. By way of example, and not limitation, computer-readable media may comprise computer storage media and communication media. Computer storage media includes both volatile and nonvolatile, removable and nonremovable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

An operating environment for devices and interfaces used for embodiments of the invention include a processing system with one or more high-speed central processing unit(s) (CPU), or other types of processors, a memory component, and a data storage component. The embodiments of the invention are described below with reference to acts and symbolic representations of operations or instructions that are performed by the processing system, unless indicated otherwise. Such acts and operations or instructions are referred to as being computer executed, CPU executed, or processor executed. The memory locations where data bits are maintained are physical locations that have particular electrical, magnetic, optical, or organic properties corresponding to the data bits.

Figure 2:
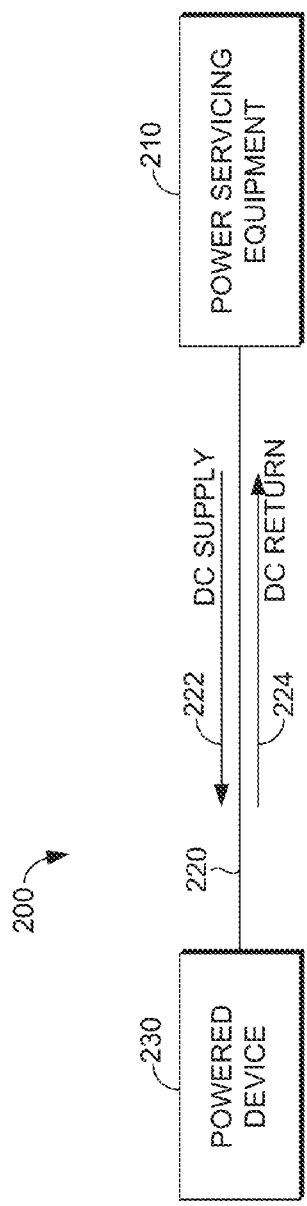
FIG. 2 is a diagram that illustrates a power over Ethernet installation according to aspects of the invention.
Figure 3:
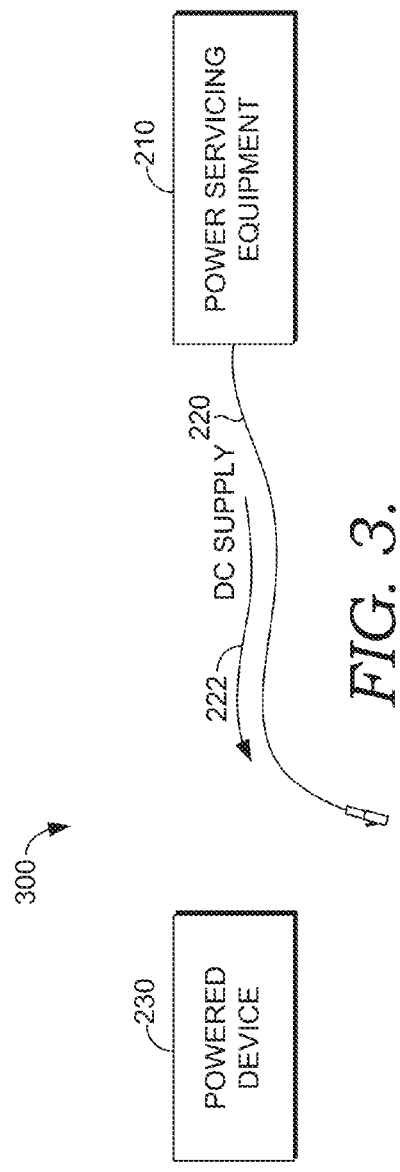
FIG. 3 is a diagram that illustrates a power over Ethernet installation having an open connection according to aspects of the invention.

Turning now to FIG. 2, a power over Ethernet installation 200 is illustrated, according to an embodiment of the present invention. As can be seen, a power servicing device 210 is connected to a powered device 230 by an Ethernet cable 220. In FIG. 2, DC power 222 is supplied on the hot conductor and returns 224 through the closed circuit on the neutral conductor. When a security breach occurs, as shown in FIG. 3 by the unplugged cable, power will not return on the neutral conductor. It should also be noted that power may not flow through the hot conductor when the Ethernet cable is unplugged. Electrical power is available upon closing the circuit, but it does not flow through the cable because it has nowhere to go. Aspects of the invention may monitor either the hot or neutral conductors in the circuit for a flow of electrons to detect a disruption. When the flow of electron stops for more than a threshold duration then a security response is initiated.

Figure 4:
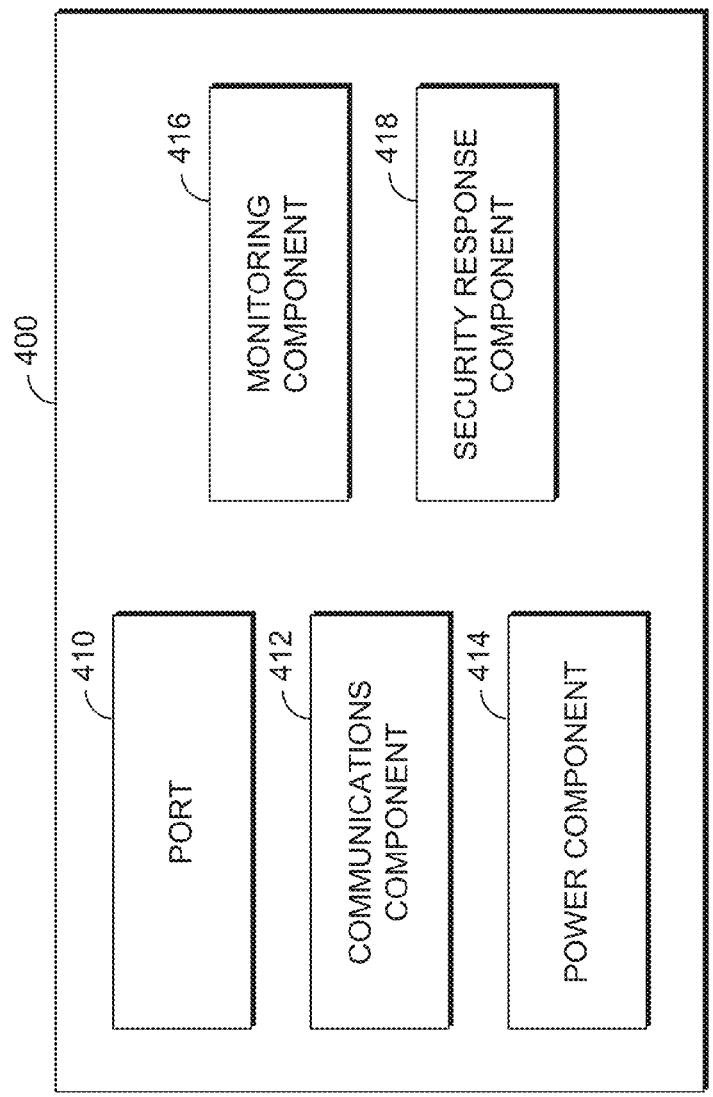
FIG. 4 is a diagram illustrating components in a security-enhanced power servicing device according to aspects of the invention.

Turning now to FIG. 4, an exemplary operating environment 400 for a power servicing device suitable for carrying out embodiments of the present invention is depicted. The power servicing device may be a router, switch, base station controller, or other equipment suitable for handling communications. FIG. 4 depicts an illustrative operating environment, referenced generally by the numeral 400, and illustrates an exemplary operating environment that can be suitable for a secure power over Ethernet installation. The illustrative operating environment 400 shown in FIG. 4 is merely an example of one suitable operating environment and is not intended to suggest any limitation as to the scope of use or functionality of embodiments of the present invention. Neither should the operating environment 400 be interpreted as having any dependency or requirement related to any single module/component or combination of modules/components illustrated therein.

Exemplary operating environment 400 includes Ethernet port 410, communications component 412, power component 414, monitoring component 416, and security response component 418. As mentioned, the exemplary operating environment 400, may be coupled to one or more powered devices through one or more Ethernet cables. Only a single instance of each component is shown for the sake of simplicity.

Ethernet port 410 comprises a physical receptacle to couple with an Ethernet cable. Ethernet port 410 also includes any software drivers and hardware necessary to enable the Ethernet port's 410 functionality. The Ethernet port 410 is capable of transmitting both electrical power and data communications through the port to an Ethernet cable.

The communications component 412 sends and receives data communications through the Ethernet cable connected to Ethernet port 410. The communications component 412 may include a buffering function, a routing function, and other functions necessary to enable communications through the Ethernet port 410. The communications component 412 may encode data according to one or more Ethernet protocols.

The power component 414 supplies power through the Ethernet port 410 to the Ethernet cable. The power component 414 may comprise the hardware necessary to generate a current having the appropriate voltage, amperage, and other electrical characteristics suitable for transmission through a particular Ethernet cable. Different Ethernet cables can carry different types of power. The power component 414 may be adaptable to provide power to different classes of Ethernet cable. Accordingly, the power component 414 may be adjusted to provide electricity with characteristics requested in instructions specifying the type of cable to be used, characteristics of the power to be provided, or some other parameters.

The monitoring component 416 monitors the flow of electricity through the power component 414. Because the power component is part of an electrical circuit with the powered device and the Ethernet cable, electricity will flow into the power component 414 from the Ethernet port 410. When the flow of power stops for a threshold amount of time, then the monitoring component 416 may notify the security response component 418. As mentioned previously, the threshold may differ depending on the installation. In general, the threshold should be less time than a person would take to plug and unplug the Ethernet cable.

The security response component 418 initiates a response to a determination that a security event has occurred. In one aspect, the response is discontinuing further data communications through the Ethernet port 410. Additionally or alternatively, a notification may be communicated to a designated responder. The designated responder may then investigate the security incident and reset the power serving device when any security issues are resolved. In one aspect, the power serving device may be reset remotely through a different communication medium, such as a wireless connection.

Turning now to FIG. 5, a method 500 for providing security to a communications system that comprises a power servicing device coupled by an Ethernet cable to a powered device is provided. The method may be performed by a power servicing device. In one aspect, the power servicing device is a layer 2 switch or router coupled by an Ethernet cable to one or more picocells. The power servicing device is able to act as a power supply for the picocell. In addition to providing power, data is communicated between the powered device and the power servicing device over the Ethernet cable. Alternatively, aspects of the invention may be performed by independent monitoring equipment and response equipment.

At step 510, a power over Ethernet connection through which electricity is supplied from the power servicing device to the powered device is monitored. The monitoring may be performed by the power servicing device. Alternatively, a separate monitoring device may be used to monitor power transmission through the Ethernet cable. The results of the monitoring may be communicated to a component that analyzes the data to detect whether a security event has occurred.

At step 520, an electrical connection formed by the power over Ethernet circuit is determined to have been disrupted for more than a threshold duration. As mentioned previously, different threshold durations may be appropriate for different installations. In general, when the Ethernet cable is unlikely to be unplugged because both ends are in a secure area, then a longer duration may be selected. Selecting a longer duration may avoid false positives that could occur with temporary disruptions. The longer duration presupposes that an intruder would need to cut the Ethernet cable to gain access to data transmitted along the cable.

At step 530, in response to said determining of step 520, further communications are automatically blocked from occurring over the power over Ethernet connection between the power servicing device and the powered device. The power servicing device may block further communications using a soft switch. For example, a power servicing device may disable port to which the Ethernet cable is attached. In one aspect, a physical switch is actuated by a power servicing component, or some other component charged with implementing security response, to break the physical connection between the powered device and the power servicing device. As mentioned, in one aspect the monitoring and response is performed by a security device located at or near the power servicing device.

In addition to discontinuing communications, an alarm or alert may be communicated. The alarm may take the form of an audible alarm at the layer 2 switch. The alert may take the form of a text, page, email, or other communication to a designated responder. The designated responder may send a technician to the installation to investigate the alarm. Upon determining that the security incident has been resolved, an instruction may be sent to reactivate communications through the Ethernet cable. Alternatively, the instruction may be communicated by pressing a button on the layer 2 switch. The button may be designated for the purpose of deactivating a security response.

Turning now to FIG. 6, a method 600 for providing security to a power over Ethernet connection is provided. Method 600 is performed by a power servicing device or separate device dedicated with providing security to a power over Ethernet installation.

At step 610, an electrical supply circuit in a power over Ethernet connection that couples the power servicing device to the powered device is monitored. At step 620, a security breach in the electrical supply circuit is detected. At step 630, in response to said determining of step 620, a security response to the security breach is automatically initiated.

Many different arrangements of the various components depicted, as well as components not shown, are possible without departing from the spirit and scope of the several embodiments of the invention. Embodiments of the invention have been described with the intent to be illustrative rather than restrictive. It will be understood that certain features and subcombinations are of utility and may be employed without reference to other features and subcombinations and are contemplated within the scope of the claims.

The invention claimed is:

1. A method for providing security to a communications system that comprises a power servicing device coupled by an Ethernet cable to a powered device, the method comprising:
   monitoring a power over Ethernet connection through which electricity is supplied from the power servicing device to the powered device;
   determining that an electrical connection formed by the power over Ethernet circuit is disrupted for more than a threshold duration; and
   in response to said determining, automatically blocking further digital communications from occurring over the power over Ethernet connection between the power servicing device and the powered device,
      wherein digital communications over the power over Ethernet connection remain blocked for a threshold waiting period and then are unblocked after the threshold waiting period passes.

2. The method of claim 1, wherein the method further comprises communicating an alarm message in response to said determining.

3. The method of claim 1, wherein the method further comprises receiving a reset message and unblocking the power over Ethernet connection to allow communications to occur over the power over Ethernet connection.

4. The method of claim 1, wherein the threshold duration is between 1 and 100 ms.

5. The method of claim 1, wherein the threshold duration is between 1 ms and 2 seconds.

6. The method of claim 1, wherein the powered device is a picocell.

7. One or more nontransitory computer-readable storage media storing computer-readable instructions thereon, that when executed by a computing device, perform a method for providing security to a power over Ethernet connection, the method comprising:
   monitoring, at a power servicing device, an electrical supply circuit in the power over Ethernet connection that couples the power servicing device to a powered device;
   detecting a security breach in the electrical supply circuit; and
   in response to said detecting, automatically initiating a security response to the security breach,
   wherein the security response comprises blocking further digital communications from occurring over the power over Ethernet connection between the power servicing device and the powered device, and
   wherein the digital communications over the power over Ethernet connection remain blocked for a threshold waiting period and then are unblocked after the threshold waiting period passes.

8. The media of claim 7, wherein the security breach occurs when the electrical supply circuit is disrupted for more than a threshold duration.

9. The media of claim 8, wherein the threshold duration is between 1 ms and 100 ms.

10. The media of claim 8, wherein the threshold duration is between 1 ms and 2 seconds.

11. The media of claim 7, wherein the powered device is a picocell.

12. The media of claim 11, wherein the picocell is located in an unsecure location.

13. A power servicing device for a power over Ethernet installation comprising:
   an Ethernet port to receive an Ethernet cable;
   a communication component to send and receive communications through the Ethernet port;
   a power component to supply power to at least one pair of conductors within the Ethernet cable:
   a monitoring component to monitor a transmission of electricity over the Ethernet cable and detect a security breach; and
   a security response component that responds to the security breach by discontinuing further communications from occurring through the Ethernet port,
      wherein digital communications over the power over Ethernet connection remain blocked for a threshold waiting period and then are unblocked after the threshold waiting period passes.

14. The power servicing device of claim 13, wherein the power servicing device is a Layer 2 switch.

15. The power servicing device of claim 14, wherein the Layer 2 switch is connected to a picocell by the power over Ethernet connection.

16. The power servicing device of claim 13, wherein the security breach occurs when the transmission of electricity is disrupted for more than a threshold duration.

17. The power servicing device of claim 16, wherein the threshold duration is between 100 and 500 ms.

18. The power servicing device of claim 13, wherein the monitoring component monitors a neutral conductor in an electrical circuit formed in the power over Ethernet installation between the power servicing device and a powered device.

* * * * *